US005297271A

United States Patent [19]

Bhayani

[11] Patent Number: 5,297,271

[45] Date of Patent: Mar. 22, 1994

[54] METHOD AND APPARATUS FOR PERFORMING A READ-WRITE-MODIFY OPERATION IN A VGA COMPATIBLE CONTROLLER

[75] Inventor: Dhimant Bhayani, San Jose, Calif.

[73] Assignee: Chips and Technologies, Inc., San Jose, Calif.

[21] Appl. No.: 52,238

[22] Filed: Apr. 21, 1993

Related U.S. Application Data

[63] Continuation of Ser. No. 586,060, Sep. 21, 1990, abandoned.

[51] Int. Cl.[5] ........................ G06F 15/62; G06F 12/00

[52] U.S. Cl. .................................... 395/425; 395/164; 365/189.01; 364/237.2; 364/237.3; 364/238.3; 364/262.4; 364/284.2; 364/DIG. 1; 345/133

[58] Field of Search ............... 395/375, 425, 164, 115, 395/400, 800, 275, 166; 340/700, 798, 747, 750; 365/189.01, 2, 6, 8, 233, 239, 275, 350, 351

[56] References Cited

U.S. PATENT DOCUMENTS

| | | | |
|---|---|---|---|
| Re. 33,922 | 5/1992 | Kimura et al. | 395/425 |
| 4,639,866 | 1/1987 | Loo | 364/200 |
| 4,695,967 | 9/1987 | Kodama et al. | 364/521 |
| 4,941,107 | 7/1990 | Haseke | 364/518 |
| 5,043,918 | 8/1991 | Murahashi | 364/519 |
| 5,109,520 | 4/1992 | Knierim | 395/800 |
| 5,115,510 | 5/1992 | Okamoto et al. | 395/775 |
| 5,175,838 | 12/1992 | Kimura et al. | 395/425 |

*Primary Examiner*—Gopal C. Ray
*Attorney, Agent, or Firm*—Townsend and Townsend Khourie and Crew

[57] ABSTRACT

A VGA controller with a read-modify-write cycle implemented therein is provided. By implementing the read-modify-write cycle in hardware, and by reducing the data for such operations to a single address source, read-modify-write operations can be performed in a single cycle, as opposed to separate read and write cycles, with a consequent improvement in overall operating speed.

5 Claims, 3 Drawing Sheets

METHOD AND APPARATUS FOR PERFORMING A READ-WRITE-MODIFY OPERATION IN A VGA COMPATIBLE CONTROLLER

This is a continuation of application Ser No. 07/586,060, filed Sep. 21, 1990, now abandoned.

BACKGROUND OF THE INVENTION

The present invention relates generally to computer graphics, and more specifically to improvements in a Video Graphics Array ('VGA') controller.

A typical prior art VGA controller has an associated display memory, which consists of an array of dynamic RAM (DRAM) chips. In graphics mode, each pixel on the display has a corresponding display memory location which contains a code (typically 4 or 8 bits) representing the color of that pixel. The CPU controls the display by writing data to the graphics controller. The graphics controller responds to such data by updating the relevant data entries in the display memory.

One of the most commonly executed functions in raster graphics applications is to move and/or modify the stored bit map of the raster image. This function is known as Bit Block Transfer, or BitBlt. In Bit Block Transfer operations, the rectangular bit map for the stored raster image is modified by performing logical operations upon it and a second, different, bit map of the raster image. These logical operations are called RasterOps.

A common sequence of steps that known VGA controllers use to accomplish a Bit Block Transfer using RasterOps is:

(a) Reading the data from a destination bit map so that the data is held in CPU latches (FIG. 4, 90*a*–*d*), thus forming the first operand to be sent to the VGA Graphics Controller;

(b) Reading data from a source bit map, which can be stored in system memory or VGA memory;

(c) Writing the source bit map data to the VGA Graphics Controller for use as the second operand;

(d) Performing the RasterOp on the first and second operand; and (e) Writing the result of the RasterOp to the CPU write data address (destination bit map).

Steps (a) through (e) are repeated for all VGA memory addresses that are encompassed by the destination rectangular bit map. All read and write operations are performed in software by the System CPU.

The use of many steps to perform this reading and writing of destination data is very time consuming when a large amount of data must be modified. A known solution to this problem is a read-modify-write cycle, wherein data is read, modified and rewritten, all in one cycle. Although these cycles are known and have been in use even prior to the implementation of read-modify-write cycles in DRAM, no known VGA controller has implemented a read-modify-write cycle for use in raster graphics operations.

SUMMARY OF THE INVENTION

The present invention provides a method and an apparatus within a VGA controller for implementing a read-modify-write cycle for use in raster graphics operations.

When a read-modify-write bit in the VGA controller is set to 1, all subsequent CPU write cycles to the VGA memory are converted into Read-Modify-Write cycles. The CPU write cycle address is used for executing the read cycle. This hardware implementation of a read-modify-write cycle cuts in half the number of bus cycles needed to perform the usual read and write cycles presently implemented in software. The read-modify-write cycle of the present invention is particularly efficient when the software intends to execute a logical operation in conjunction with the read-modify-write cycle.

DESCRIPTION OF THE SPECIFIC EMBODIMENT(S)

System Overview

Figure 1:
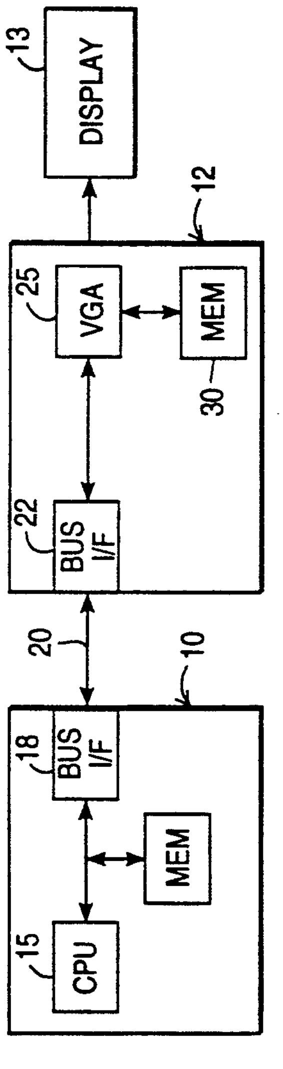
FIG. 1 is a high level block diagram of a computer system including a graphics board having a VGA controller chip.

FIG. 1 is high level block diagram of a computer system including a processor subsystem 10, a graphics subsystem 12, and a display 13. The computer subsystem includes a CPU 15, an associated memory 17, and an expansion bus interface 18 to an expansion bus 20. Since graphics subsystem 12 is typically implemented on a circuit board that plugs into a connector on expansion bus 20, it will be referred to as graphics board 12. The graphics board is coupled to the expansion bus by a bus interface 22, and further includes a controller unit 25 and an associated display memory 30. Bus 20 may be an industry standard architecture (ISA) bus (sometimes called an AT-bus) or a Microchannel Architecture (MCA) bus. Controller unit 25 is an extended VGA controller chip.

Figure 2:
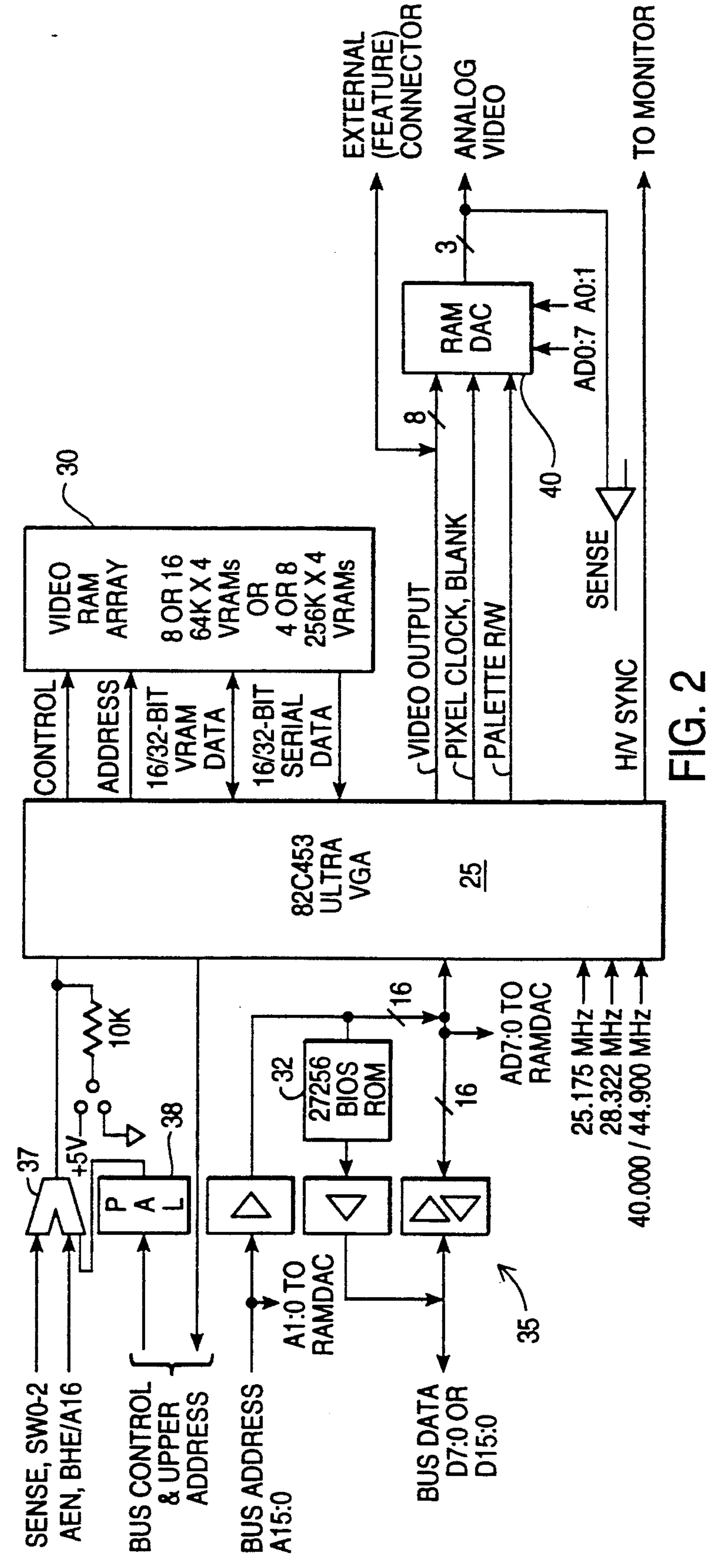
FIG. 2 is a block diagram of the graphics board.

FIG. 2 is a block diagram of graphics board 12. Display memory 30 is implemented as a video RAM (VRAM) array 30 that interfaces with VGA chip 25 through parallel and serial data ports. The graphics board also includes a BIOS ROM 32 and an optional color palette chip 40. The bus interface includes buffers 35, a multiplexer 37, and a PAL chip 38. The general configuration of the graphics board is known in the art, and will not be described further.

VGA Chip

Figure 3:
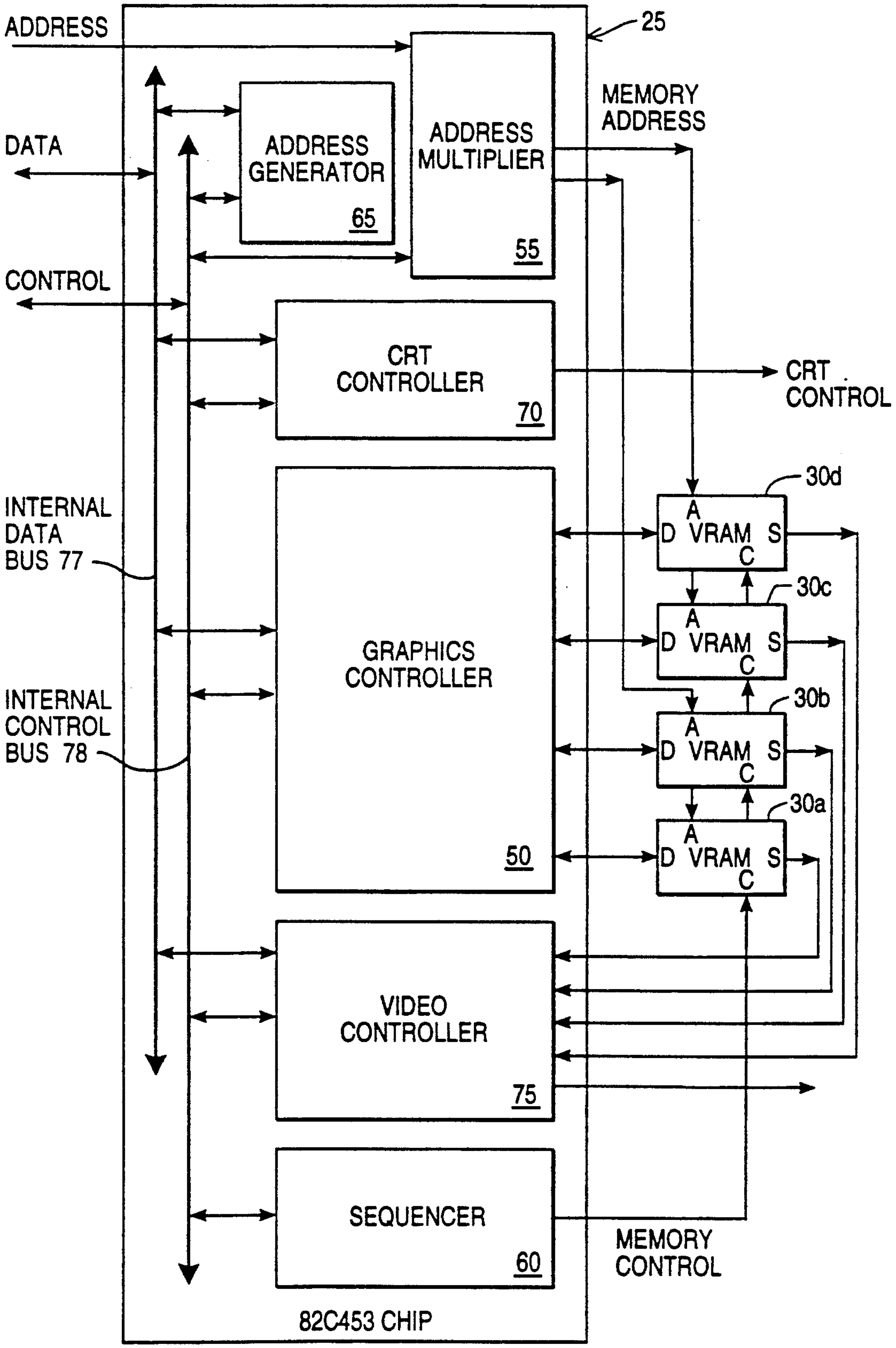
FIG. 3 is a block diagram of the VGA controller chip.

FIG. 3 is a block diagram of VGA chip 25 and VRAM array 30. The major functional entities of VGA chip 25 include a graphics controller 50, an address multiplexer 55, a sequencer 60, an address generator 65, a CRT controller 70, and a video controller 75. Internal data and control buses 77 and 78 couple the external data and control buses to the various functional entities.

The display memory consists of an array of VRAM chips logically organized in four planes, each of which typically contains one or two VRAM chips. Planes 0, 1, 2, and 3 are shown with reference numerals 30*a*, 30*b*, 30*c* and 30*d*. When the VGA chip is in text mode, planes 0 and 1 contain text and attribute information, plane 2 contains font information and plane 3 is not used. When the VGA chip is in the graphics mode, all planes are merely parts of a bit-mapped display memory with 4 or 8 bits per pixel.

Address multiplexer 55 converts incoming address information to address signals that are communicated to display memory 30. In the particular embodiment there are actually two memory address buses, one to planes 0 and 1, and one to planes 2 and 3. However, in the graphics mode, both the memory buses have the same value.

Sequencer 60 generates memory read, write or read-modify-write timing for CPU accesses, the DRAM refresh timing, and the data transfer cycle timing (which is specific to video RAMs) and arbitrates CPU read and write cycles, refresh cycles and data transfer cycles. It generates the row and column address strobes (RAS and CAS) and the Write Enable (WE), Output Enable (OE), and Shift Clock (SCLK) signals for the VRAMS.

Address generator 65 generates linear addresses for VRAM refresh and communicates these to sequencer 60, which generates the actual addressing strobes. The address generator is also responsible for video refresh and generates addresses to the display memory.

CRT controller 70 generates CRT timing for the monitor, namely the horizonal and vertical sync signals (HSYNC and VSYNC) and the blanking signal. It also provides timing control to the address generator for the video refresh and generates timing for sequencer to tell it when to access the VRAM array for video refresh.

Video controller 75 receives video information for the display, serializes it, and sends it out on the video bus. In the planar graphics mode, it sends a 6-bit color code from an internal color palette and two programmable bits onto the video bus. In the packed pixel mode it sends all 8 bits from the VRAM onto the video bus.

Figure 4:
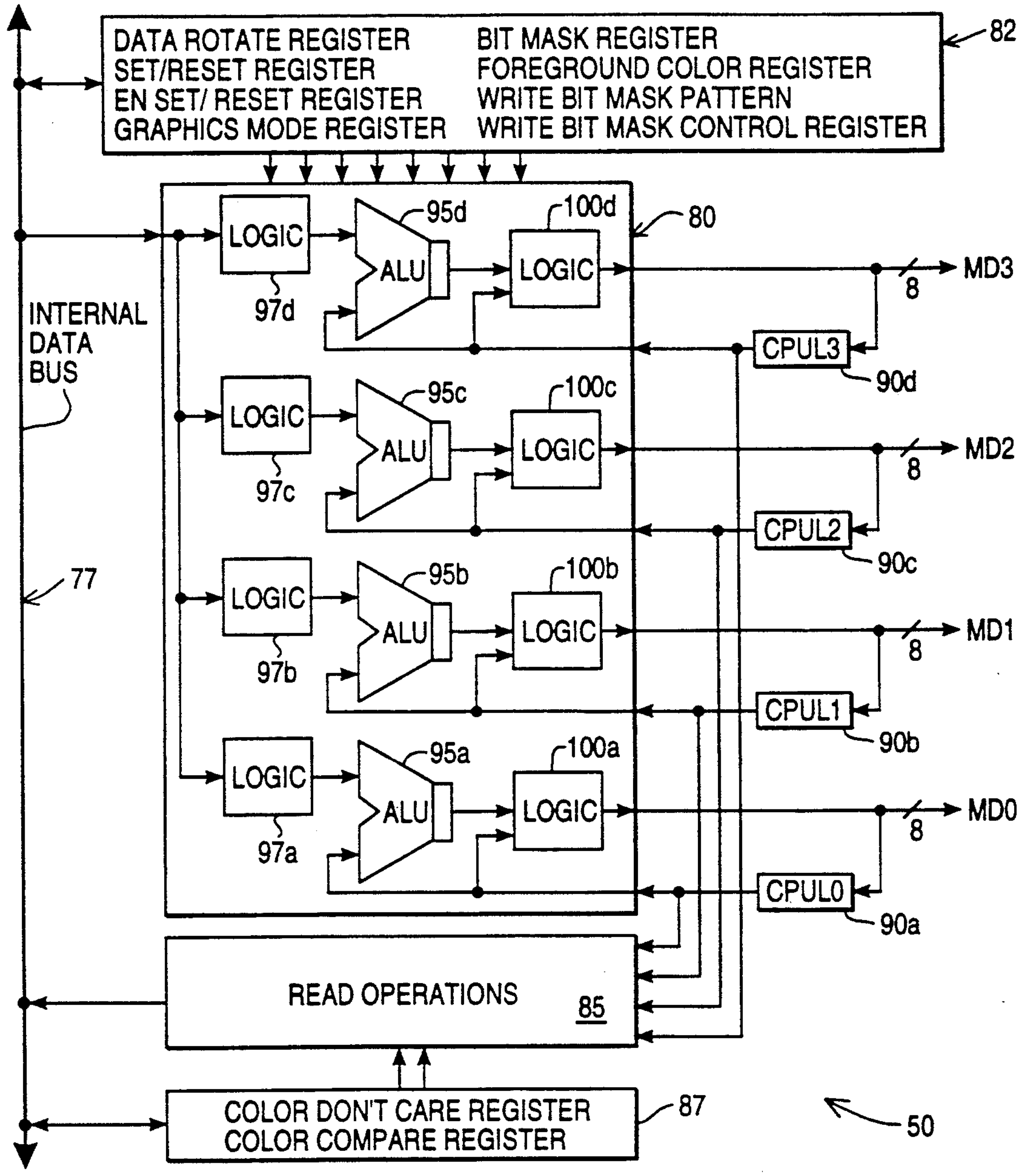
FIG. 4 is a block diagram of the graphics controller portion of the VGA controller chip.

FIG. 4 is a block diagram of the graphics controller portion of VGA chip 25. This portion of the chip includes write operation logic 80 and associated write operation control registers 82, read operation logic 85 and associated read operation control registers 87, and a set of CPU latches 90*a-d*. The CPU latches have inputs coupled to the data paths between the write operation logic and the display memory and are loaded from the display memory by a CPU read operation. The latch outputs communicate with portions of the write operation logic and with the read operation logic.

Write operation logic 80 is shown as having four data paths, corresponding to the four memory planes. The data paths include respective ALUs 95*a-d* for performing logical operations between incoming bus data, as possibly modified by input logic 97*a-d*, and the content of CPU latches 90*a-d*. The ALU outputs, possibly modified by output logic 100*a-d*, are communicated to the display memory.

Read-Modify-Write Cycle in the VGA Controller

Figure 5:
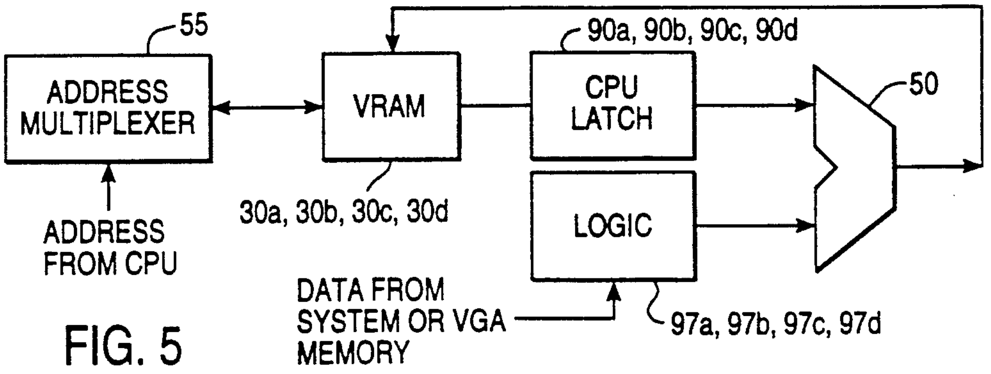
FIG. 5 is a block diagram of the present invention when the read-modify-write cycle is being used.

One embodiment of the present invention is shown in FIG. 5. In this embodiment, the function of a read-modify-write operation is realized exclusively in hardware. Only one address source is used. In operation, once the read-modify-write feature has been enabled by switching the appropriate bit in Sequencer 60 on, the cycle proceeds in the following manner:

First, the data operand is fetched from systems or VGA memory, stored in loqic 97*a-d*, and presented to VGA graphics controller 50. Second, data is read from the VGA memory's write address, shown here as Address Multiplexer 55, and latched successively into VRAM 30*a-d* and CPU latch 90*a-d*.

The desired logical operation is then performed on the operands using VGA graphics controller 50. The logical operation is performed on operands from the CPU write data and the VGA data specified in the VGA memory write address.

Finally, the result of the logic operation is written to the VGA memory 30*a-d* at the VGA memory write address initially specified by the CPU.

The advantages of the present invention include reducing the CPU read and write operation from two complete cycles requiring roughly 875 nanoseconds to one CPU write operation requiring between 500 to 625 nanoseconds. In many systems the read and write operations are even slower, increasing the speed advantage of the present invention. Additionally, as the present invention's data path has only one address source, the data that is read is always the data modified. The second operand always comes with the CPU write cycle. Finally, no software is required to perform the read cycle to obtain the destination data operand.

The present invention, a read-modify-write cycle in a VGA controller, has now been fully described in one particular embodiment. Although the present invention has been disclosed and described with respect to a preferred embodiment thereof and in connection with one exemplary use, it will be understood by those skilled in the art that various changes in form and detail may be made therein without departing from the spirit and scope thereof.

What is claimed is:

1. In the operation of a video graphics array controller having a memory and a timing sequencer, said video graphics array controller being coupled to a CPU, a method for implementing a read-modify-write cycle comprising the steps of:

enabling the read-modify-write cycle by setting a read-modify-write control bit for said sequencer;

specifying a particular logical operation;

said CPU generating a hardware request for a write operation to the video graphics array memory, said hardware request specifying a first operand value, and a video graphics array memory write address;

said sequencer generating timing signals for a read-modify-write cycle when said control bit is set;

reading a second operand value from the video graphics array memory write address;

performing the particular logic operation on the first operand value and the second operand value to produce a result; and writing the result of performing the particular logic operation to the video graphics array memory write address, wherein said reading, performing, and writing steps all take place during said read-modify-write cycle.

2. The method of claim 1, wherein said method of implementing a read-modify-write cycle is performed during a graphics mode of said video graphics array controller, wherein said video graphics array memory comprises a plurality of memory planes accessible during said graphics mode, and wherein said steps of reading and writing apply a single address to all of said plurality of memory planes during said single read-modify-write cycle.

3. An apparatus for performing a read-modify-write cycle in a video graphics array controller having a memory, said video graphics array controller being coupled to a CPU, the apparatus comprising:

a timing sequencer coupled to said CPU;

means for specifying a particular logical operation means for enabling the read-modify-write cycle by setting a read-modify-write control bit for said sequencer;

means, coupled to said CPU, for receiving from said CPU a hardware request for a write operation to the video graphics array memory, said hardware request specifying a first operand value, and a video graphics array memory write address, said sequencer generating read-modify-write timing signals for a read-modify-write cycle when said control bit is set;

means responsive to the read-modify-write timing signals and to said hardware request for reading a second operand value from the video graphics array memory write address during the read-modify-write cycle;

means for performing the particular logic operation on the first operand value and the second operand value to produce a result during said read-modify-write cycle; and means for writing the result of performing the particular logic operation to the video graphics array memory write address during said read-modify-write cycle.

4. The apparatus of claim 3, wherein said apparatus for performing a read-modify-write cycle is configured to provide only a single address to said memory during said read-modify-write cycle, said single address being said write address.

5. The apparatus of claim 4, wherein said read-modify-write cycle is employed during a graphics mode of said video graphics array controller, wherein said video graphics array memory comprises a plurality of memory planes accessible during said graphics mode, and wherein said single address is applied to all of said plurality of memory planes.

* * * * *